(12) United States Patent
Aubauer et al.

(10) Patent No.: US 9,552,068 B2
(45) Date of Patent: Jan. 24, 2017

(54) INPUT DEVICE WITH HAND POSTURE CONTROL

(71) Applicant: Microchip Technology Incorporated, Chandler, AZ (US)

(72) Inventors: Roland Aubauer, Wessling (DE); Johannes Matokic, Geltendorf (DE); Claus Kaltner, Bergkirchen/Unterbachern (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 550 days.

(21) Appl. No.: 13/975,579

(22) Filed: Aug. 26, 2013

(65) Prior Publication Data
US 2014/0055396 A1    Feb. 27, 2014

Related U.S. Application Data

(60) Provisional application No. 61/693,617, filed on Aug. 27, 2012.

(51) Int. Cl.
*G06F 3/041* (2006.01)
*G06F 3/01* (2006.01)
*G06F 3/0488* (2013.01)

(52) U.S. Cl.
CPC ............... *G06F 3/017* (2013.01); *G06F 3/041* (2013.01); *G06F 3/04883* (2013.01); *G06F 2203/04101* (2013.01)

(58) Field of Classification Search
CPC ...................................................... G06F 3/017
USPC ........................................................ 345/173
See application file for complete search history.

(56) References Cited

U.S. PATENT DOCUMENTS

| 8,345,015 | B2 | 1/2013 | Ivanov | 345/173 |
| 8,436,828 | B1* | 5/2013 | Zhai | G06F 3/0416 345/173 |
| 2002/0027549 | A1 | 3/2002 | Hirshberg | 345/168 |
| 2006/0190836 | A1* | 8/2006 | Ling Su | G06F 1/1616 715/773 |
| 2008/0036743 | A1* | 2/2008 | Westerman | G06F 3/038 345/173 |

(Continued)

FOREIGN PATENT DOCUMENTS

| DE | 102007020873 A1 | 10/2008 | G01V 3/12 |
| DE | 102010007455 A1 | 8/2011 | G06F 3/00 |
| WO | 2011/128116 A2 | 10/2011 | G06F 3/044 |

OTHER PUBLICATIONS

Wang, Feng et al., "Detecting and Leveraging Finger Orientation for Interaction with Direct-Touch Surfaces," Proceedings of the 22$^{nd}$ Annual ACM Symposium on User Interface Software and Technology, UIST '09, 10 pages, Oct. 4, 2009.

(Continued)

*Primary Examiner* — Jason Olson
(74) *Attorney, Agent, or Firm* — Slayden Grubert Beard PLLC

(57) ABSTRACT

A gesture detection system according to embodiments includes an input device including a touch sensitive surface and a contact-free detection system; and a controller configured to determine characteristic parameters for the position in three-dimensional space of a user input object and select an operational mode of the input device based on the position of the user input object.

32 Claims, 15 Drawing Sheets

(56) References Cited

U.S. PATENT DOCUMENTS

| | | | |
|---|---|---|---|
| 2010/0107099 A1* | 4/2010 | Frazier | G06F 3/044 |
| | | | 715/765 |
| 2010/0271331 A1* | 10/2010 | Alameh | G06F 3/0421 |
| | | | 345/175 |
| 2011/0012840 A1* | 1/2011 | Hotelling | G06F 3/0418 |
| | | | 345/173 |
| 2013/0147833 A1 | 6/2013 | Aubauer et al. | 345/619 |
| 2013/0194519 A1 | 8/2013 | Ivanov | 349/12 |
| 2014/0028571 A1* | 1/2014 | St. Clair | G06F 3/0412 |
| | | | 345/173 |

OTHER PUBLICATIONS

Takeoka, Yoshiki et al., "Z-touch: An Infrastructure for 3D Gesture Interaction in the Proximity of Tabletop Surfaces," ACM International Conference on Interactive Tabletops and Surfaces, ITS '10, 4 pages, Nov. 7, 2010.

Rogers, Simon et al., "AnglePose: Robust, Precise Capacitive Touch Tracking via 3D Orientation Estimation," School of Computing Science, University of Glasgow, CHI 2011, 10 pages, May 7, 2011.

International Search Report and Written Opinion, Application No. PCT/EP2013/067746, 11 pages, Dec. 16, 2013.

* cited by examiner

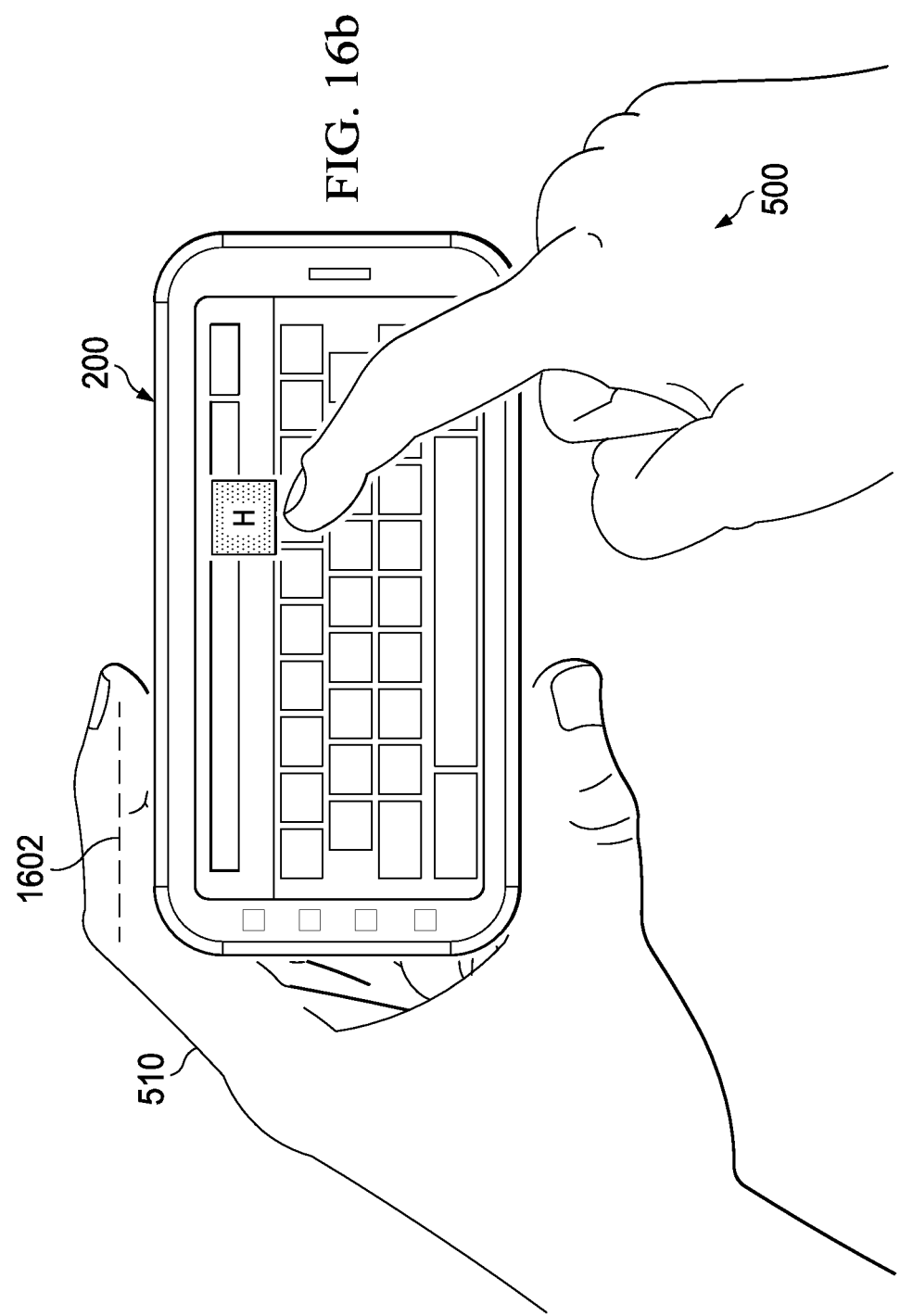

INPUT DEVICE WITH HAND POSTURE CONTROL

CROSS REFERENCE TO RELATED APPLICATIONS

This application claims priority from U.S. Provisional Patent Application Ser. No. 61/693,617 filed Aug. 27, 2012, which is hereby incorporated by reference in its entirety as if fully set forth herein.

TECHNICAL FIELD

The present disclosure relates to human interface device and, in particular, to a touch sensor system for emulating a keyboard on a mobile device.

BACKGROUND

On small devices like smartphones and tablet PCs, the space for the "keyboard" presented on the display touch panel of the graphical user interface is limited and typically much smaller than in regular keyboards. Furthermore, because of the nature of the display touch panel, ten-finger typing is not possible.

In many display touch panels, the number of keys is reduced to a minimum. For example, in many such keyboard displays, there is only one shift key, no keylock key, no number keys, and no special character keys. Those characters can only be accessed via extra input modes reachable via a shift key, which display a second "keyboard." Thus, it is always required to make two consecutive keystrokes to access upper keys, numbers, special characters or additional control functions.

SUMMARY

A gesture detection method according to embodiments includes detecting a touch position; selecting an input mode depending on characteristic parameters of a position of an input object; and entering the input character either after calculating the characteristic parameters or according to the release of the respective touch. In some embodiments, an input mode is switched upon detection of a parameter change of the three-dimensional sensor system. In some embodiments, the parameters are determined by an elevation level of an input object performing a touch. In some embodiments, the input object is a hand and the parameters are determined by lifting a finger from the hand holding a mobile device. In some embodiments, the parameters are determined by an azimuth angle of the hand performing a touch. In some embodiments, a first elevation angle selects a first input mode and a second elevation angle selects a second input mode. In some embodiments, a first azimuth angle selects a first input mode and a second azimuth angle selects a second input mode.

A gesture detection system according to embodiments includes an input device including a touch sensitive surface and a contact-free detection system; and a controller configured to determine characteristic parameters for the position in three-dimensional space of a user input object and select an operational mode of the input device based on the position of the user input object. In some embodiments, the input device or the connected system includes a graphical user interface. In some embodiments, the position in three-dimensional space of the user input object includes determining an azimuth angle of the user input object and selecting a character on the graphical user interface based on the azimuth angle. In some embodiments, determining the position in three-dimensional space of the user input object includes determining an elevation angle of the user input object and selecting a character on the graphical user interface based on the elevation angle. In some embodiments, the controller is configured to determine a position in three-dimensional space of a second user input object and select an operational mode of the input device based on the position of the second user input object. In some embodiments, the operational mode of the input device includes displaying an options menu based on the position in three-dimensional space of the user input object. In some embodiments, the system includes a dictionary accessible responsive to detection of typed text and the position in three-dimensional space of the user input object. In some embodiments, the controller is further configured to provide one or more auto-completion options from the dictionary associated with the typed text based upon the position in three-dimensional space of the user input object.

An electronic device in accordance with embodiments includes an input device including a touch sensitive surface and a contact-free detection system; a display device for displaying selections using the input device; and a controller configured to determine parameters associated with a position in three-dimensional space of a user input object relative to the touch sensitive surface and select an operational mode of the input device based on the position of the user input object. In some embodiments, determining parameters associated with the position in three-dimensional space of the user input object includes determining an azimuth angle of the user input object and selecting a character on the graphical user interface based on the azimuth angle. In some embodiments, determining parameters associated with the position in three-dimensional space of the user input object includes determining an elevation angle of the user input object and selecting a first or second character on the graphical user interface based on the elevation angle. In some embodiments, the controller is configured to determine parameters associated with a position in three-dimensional space of a second user input object and select an operational mode of the input device based on the position of the second user input object. In some embodiments, the operational mode of the input device includes displaying an options menu based on the position in three-dimensional space of the user input object. In some embodiments, the device includes a dictionary accessible responsive to detection of typed text and the parameters. In some embodiments, the controller is further configured to provide one or more auto-completion options from the dictionary associated with the typed text based upon the parameters.

A method in accordance with embodiments includes detecting position-related parameters of a user input object in three-dimensional space; and selecting a mode of operation of an electronic device based on the position-related parameters. In some embodiments, the mode of operation includes selecting first or second characters on a graphical user interface based on the position-related parameters. In some embodiments, the position-related parameters comprise an azimuth angle of the user input object. In some embodiments, the position-related parameters comprise an elevation angle of the user input object. In some embodiments, detecting position-related parameters of a second user input object in three dimensional space and selecting a mode of operation of the electronic device based on the position-related parameters of the second user input object in three dimensional space. In some embodiments, detecting position-related parameters of a second user input object in three dimensional space and selecting a mode of operation of the electronic device based on the position-related parameters of the second user input object in three dimensional space. In some embodiments, selecting the mode of operation includes selecting one or more controls on the graphical user interface based on the position-related parameters. In some embodiments, the method further includes accessing a dictionary responsive to detection of typed text and the position-related parameters. In some embodiments, the method includes providing one or more auto-completion options from the dictionary associated with the typed text based upon the position-related parameters.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 16a and FIG. 16b illustrates an example of an elevation control.

DETAILED DESCRIPTION

Figure 1:
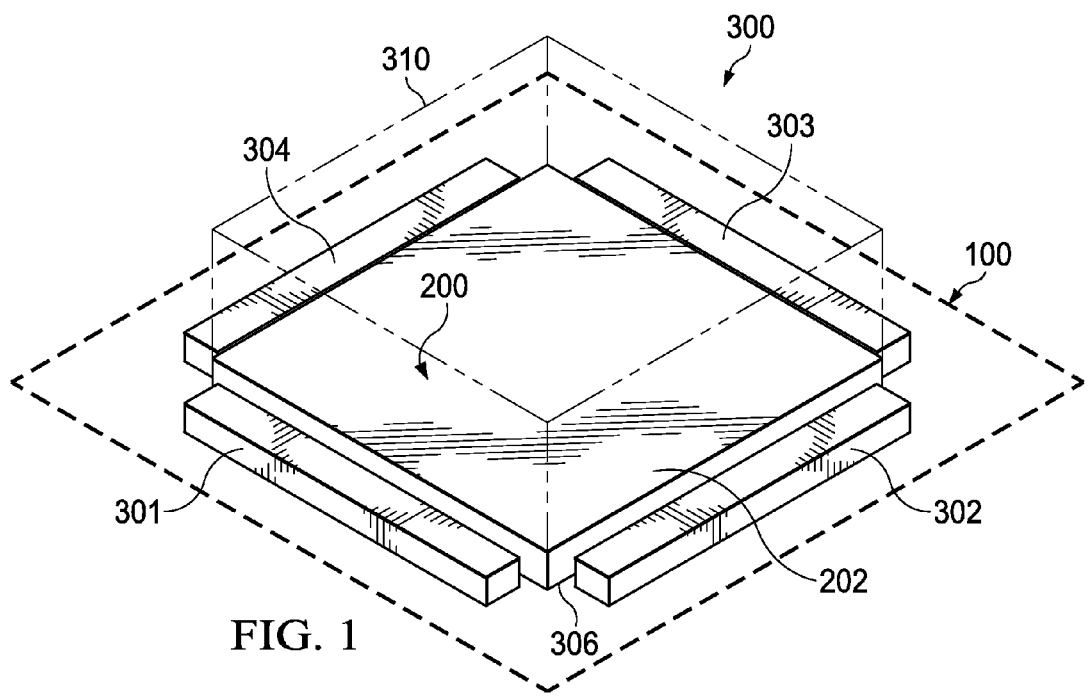
FIG. 1 is an isometric view of a general schematic representation of an electronic device with a touch-sensitive surface and contact-free detection means according to some embodiments.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Generally, typing on small devices like smart phones or tablets is uncomfortable because the small keys need to be pressed precisely which makes a fluent usage difficult. The fewer keys needed to be pressed, the easier is the typing. According to various embodiments, methods which switch between upper case, lower case, and special characters (or switch between other characters or keyboard inputs) and combine hand posture control with grammar check and dictionary usage may be provided, allowing for comfortable writing with one finger on a small keyboard. Various embodiments simplify access to special character keys on display touch panels to only one instead of two user interactions, i.e., to a single key press.

As will be described in greater detail below, the reduction of required key presses can be done according to various embodiments, by detecting both the touch position and the change in elevation $\alpha$ and azimuth $\beta$. In some embodiments, a position of an input object relates to a spatial configuration of the input object and may include either or both of a position of a center of gravity of the object or a posture or orientation of such an object. For example, in case of a hand, the position may include the orientation in space and/or the hand posture.

A suitable technique for such detecting can be electric field measurement, for example by injecting a signal having a frequency of about 50 kHz-200 kHz into a transmitting electrode and measuring voltages from various receiving electrodes which can be arranged near the surface of a handheld device. Switching between upper and lower case can be achieved according to various embodiments, by varying the elevation of the hand during touch. Switching between upper and lower case can also be achieved by movement of a second finger, for example a second finger of the hand holding the mobile device. According to various other embodiments, selection of special characters, word auto completion, and correction can be achieved by changing the azimuth of the hand posture.

Hand Posture Detection System

As will be discussed in greater detail below, the various embodiments detect hand posture and use hand posture for controlling an electronic device. Thus, it may be helpful to first describe a system that may be used for detecting such hand posture. Additional details on a system and method for such detection are described in commonly-assigned, co-pending U.S. patent application Ser. No. 13/315,739, titled "Electronic device with a user interface that has more than two degrees of freedom, the user interface comprising a touch-sensitive surface and contact-free detection means," filed Dec. 9, 2011, which is hereby incorporated by reference in its entirety as if fully set forth herein.

Figure 2:
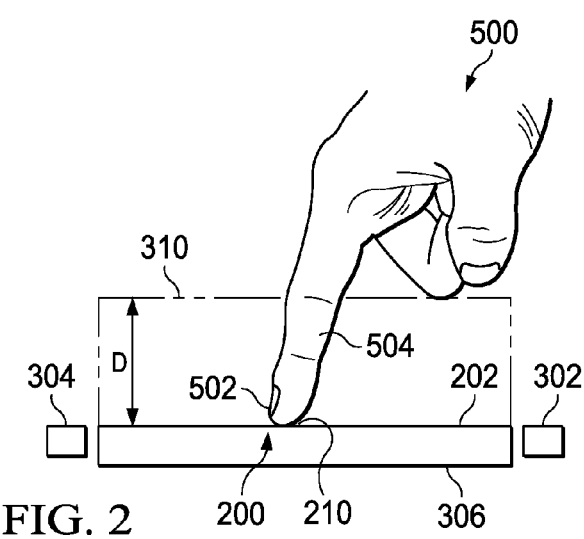
FIG. 2 is a cross sectional view of the general schematic representation of an electronic device with a touch-sensitive surface and contact-free detection means according to some embodiments.

FIG. 1 is a general schematic representation of an electronic device 100 that is adapted for determining a first positional information and a second positional information regarding a user input object. The electronic device may be a tablet computer but could be any electronic device that is itself a user interface or comprises a user interface, such as a mobile phone, mp3 player, PDA, tablet computer, computer, remote control, radio, computer mouse, touch-sensitive display, keyboard, keypad, and television. The user input object 500 (FIG. 2) is shown as user finger 500, but may be anything like a stylus (e.g., a small pen-shaped instrument), or a digital pen.

In one embodiment, the electronic device 100 comprises a touch-sensitive module 200 including, for example, a touch sensitive surface and/or display that serves as a user-interface by being suitable for detecting a user input object 500 that touches an active area 202 of the touch-sensitive module 200. The touch-sensitive module 200 not only detects that a user input object 500 touches its active area 202, it also detects where the user input object 500 makes contact with the active area, i.e., the touch-sensitive display extracts the x- and y-coordinates of the contact area (for example, the weighted geometric mean position or, if the active area is divided into sensor segments, all sensor segments that are contacted) between the touch-sensitive module 200 and said user input object 500. Thus, the touch-sensitive surface 200 determines first positional information, the first positional information solely depending on where the user input object 500 contacts the touch-sensitive module 200.

In this embodiment, the touch sensitive surface is based on capacitive sensor technology, wherein the active area 202 of the touch-sensitive module 200 is divided into segments, each segment comprising a capacitive sensor element 204 (FIG. 4); however, a wide variety of different sensor technologies could just as well form the basis of touch-sensitive surface 200, for example: resistive, capacitive (e.g., surface capacitive, projected capacitive, mutual capacitive, self capacitive), surface acoustic wave, infrared, optical imaging, dispersive signal, and acoustic pulse recognition sensor technology. In this embodiment, the touch sensitive module 200 is a touch-sensitive display, which is suitable for displaying information generated by the electronic device 100.

The electronic device 100 may further include a contact-free detection system 300. In general, contact-free detection system 300 in this sense is any system suitable for determining second positional information depending on the spatial configuration of the user input object 500 with regard to the touch-sensitive surface 200. The spatial configuration of the user input object 500 is to be understood as the three-dimensional arrangement, location, and orientation of the user input object 500 with regard to the touch-sensitive module 200. The user input object 500 is, as shown in the figures, a user finger 500; therefore, the spatial configuration refers to the space that the finger 500 occupies.

While the user input object 500 may remain touching the same contact area 210 on the touch-sensitive module 200, its spatial configuration may change. A concrete example is a user finger 500 that touches one specific contact area on the touch-sensitive area while the hand connected to the finger 500 moves to the left, to the right, up or down. Thus, the spatial configuration of the finger 500 changes while the contact area 210 with the touch-sensitive surface 202 remains the same. By determining second positional information, the electronic device 100 determines information depending on the spatial configuration of the user input object with regard to the touch-sensitive module 200 (and/or with regard to a predefined reference point thereon).

Figure 3:
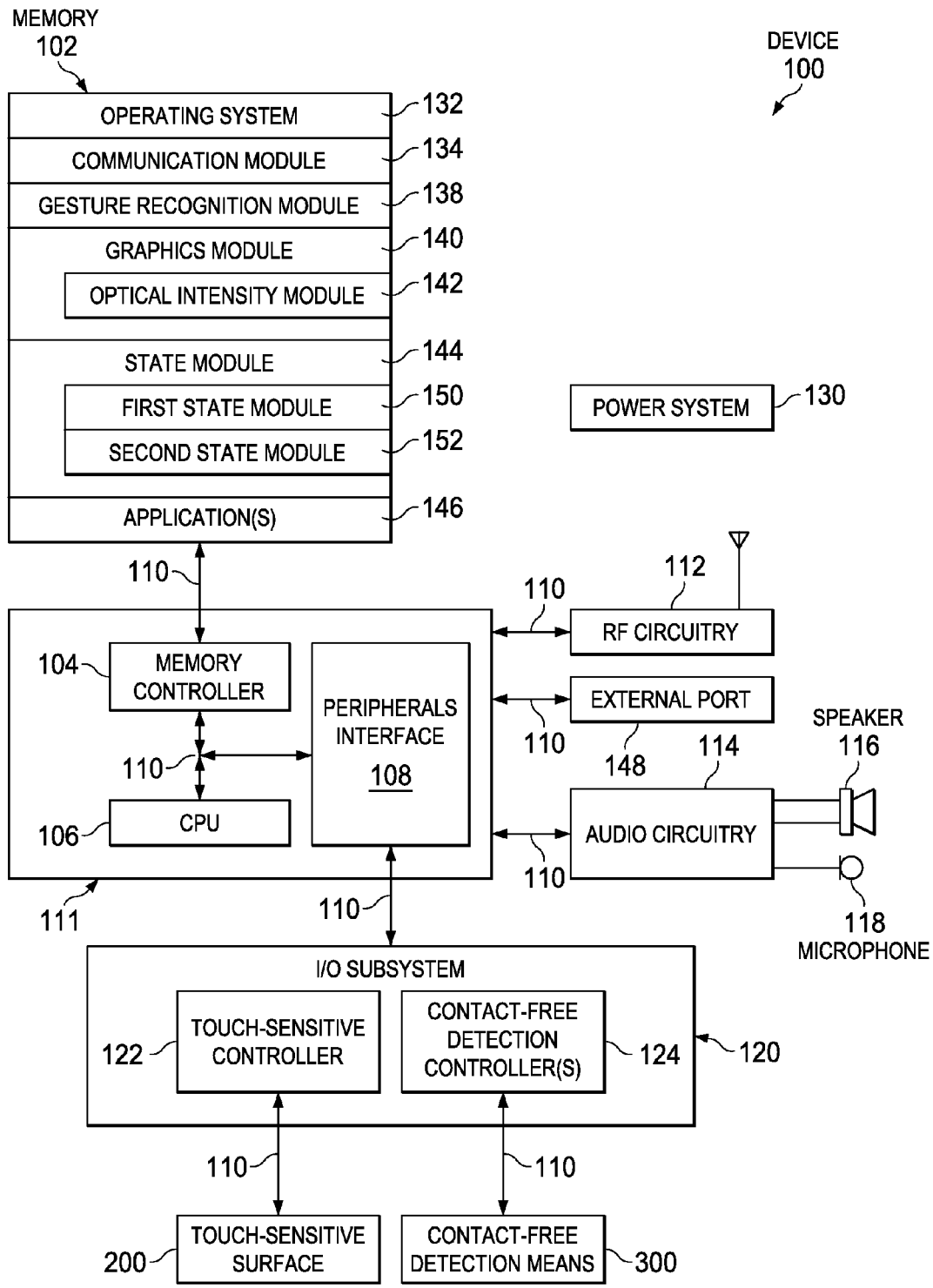
FIG. 3 is a block diagram illustrating an example electronic device, which is in accordance with some embodiments.

Specifically, in the embodiment shown, the contact-free detection system 300 is based on capacitive sensing by means of a plurality of electrodes. FIG. 1 schematically shows an arrangement of a back electrode 306 that generates an electric field and four field-detection electrodes 301, 302, 303, 304. Here, the four electric-field-detection electrodes 301, 302, 303, 304 are shown as separate units while the back electrode 306 is shown as a part of the touch-sensitive module 200. However, each of the electric-field-detection electrodes 301, 302, 303, 304 and the back electrode 306 may be either a part of the touch-sensitive module 200 or a separate entity. At least each of the electric-field-detection electrodes 301, 302, 303, 304 and the field generating electrode 306 is operatively connected to a contact-free-detection controller 124 (FIG. 3). The back electrode may, for example, be a VCOM electrode of the touch-sensitive display comprising the touch-sensitive module 200. The contact-free detection means 300 in the form of a capacitive sensing system may be operated in two modes, namely: (1) in the shunt mode, where the user input object 500 alters the coupling between the electric field generation electrode 306 and the detection electrodes 301, 302, 303, 304, wherein the hand absorbs the electric field and thus reduces the field detected by the detection electrodes; and, (2) in the self- or absolute capacitance mode, where the user input object 500 loads the electric field generation and detection electrodes 301, 302, 303, 304 or increases the parasitic capacitance of the electrodes to ground The electronic device 100 also comprises a controller operatively connected to the touch-sensitive module 200 and to the contact-free detection system 300. The controller may be any means suitable for processing the information and/or data (that may be analog or digital) obtained from the touch-sensitive surface and from the contact-free detection means. The controller may comprise one or more controllers, processors, integrated circuits (IC), application-specific integrated circuit (ASIC), analogue-to-digital converters (ADC), and/or programmable computing machines. In this specific embodiment, the controller comprises a subsystem 120 with at least two controllers: a touch-sensitive surface controller 122 and the contact-free detection controller 124 already mentioned above. Both controllers are embodied as application-specific integrated circuits (ASICs). In some embodiments, those two controllers are embodied as a single ASIC.

The controller 120 is adapted for simultaneously and/or alternately determining the first positional information via the touch-sensitive surface and the second positional information via the contact free detection system 300. How both the first and the second positional information are determined simultaneously and/or alternately depends on the concrete embodiment of the electronic device 100. Here, both the contact free detection means 300 and the touch-sensitive module 200 are based on capacitive sensing.

In such a system, the problem may arise that their measurements interfere with each other. To solve the interference problem or prevent such a problem from arising, a multiplexing method may be employed. In some embodiments presently discussed, both frequency-division-multiplexing as well as time-division-multiplexing or event triggered multiplexing are implemented.

For time-division-multiplexing, time is divided into intervals, wherein, in two consecutive time intervals, the first positional information is determined via the touch-sensitive module 200 in one of the two time intervals, and the second positional information is determined via the contact-free detection means in the other of the two time intervals. Each time interval may be in the order of milliseconds. Each time interval may be less than 100 ms, 10 ms, 1 ms, or 0.1 ms. Time-division-multiplexing allows for alternately determining the first and the second positional information so that, at any given point in time, both up-to-date first and second positional information is available in the electronic device 100.

For event triggered multiplexing, the contact free detection means 300 is continuously active until it detects a touch-event. On touch event detection, the contact free detection means 300 is deactivated and the touch-sensitive module 200 activated and detects the touch position. When no touch is detected on the touch-sensitive module 200, the contact free detection means 300 is activated again.

For frequency-division-multiplexing, non-overlapping frequency ranges are assigned to the touch-sensitive module 200 and the contact-free detection means 300 for generating and detecting electric fields (and thus for capacitive sensing). In this way, the same media (space in front of the touch-sensitive surface and/or commonly used electrode(s)) may be used by both the touch-sensitive module 200 and the contact-free detection means 300. Consequently, frequency-division-multiplexing allows for simultaneously determining the first and the second positional information so that, at any given point in time, both up-to-date first and second positional information is available in the electronic device 100.

In some embodiments, the first positional information comprises a first position that depends on where the user input object contacts the touch-sensitive surface, and the second positional information comprises a second position that depends on the spatial configuration of a portion of the user input object that is within a predefined distance D (FIG. 2) of the touch-sensitive surface. The space defined by the touch-sensitive surface and the predefined distance is shown as cuboid 310. The predefined distance is defined by the controller 120 and the contact-free detection system 300. In particular, the predefined distance is defined by the geometry of the electric field generated by the back electrode 306 and the electric-field-detection electrodes 301, 302, 303, 304.

Figure 4:
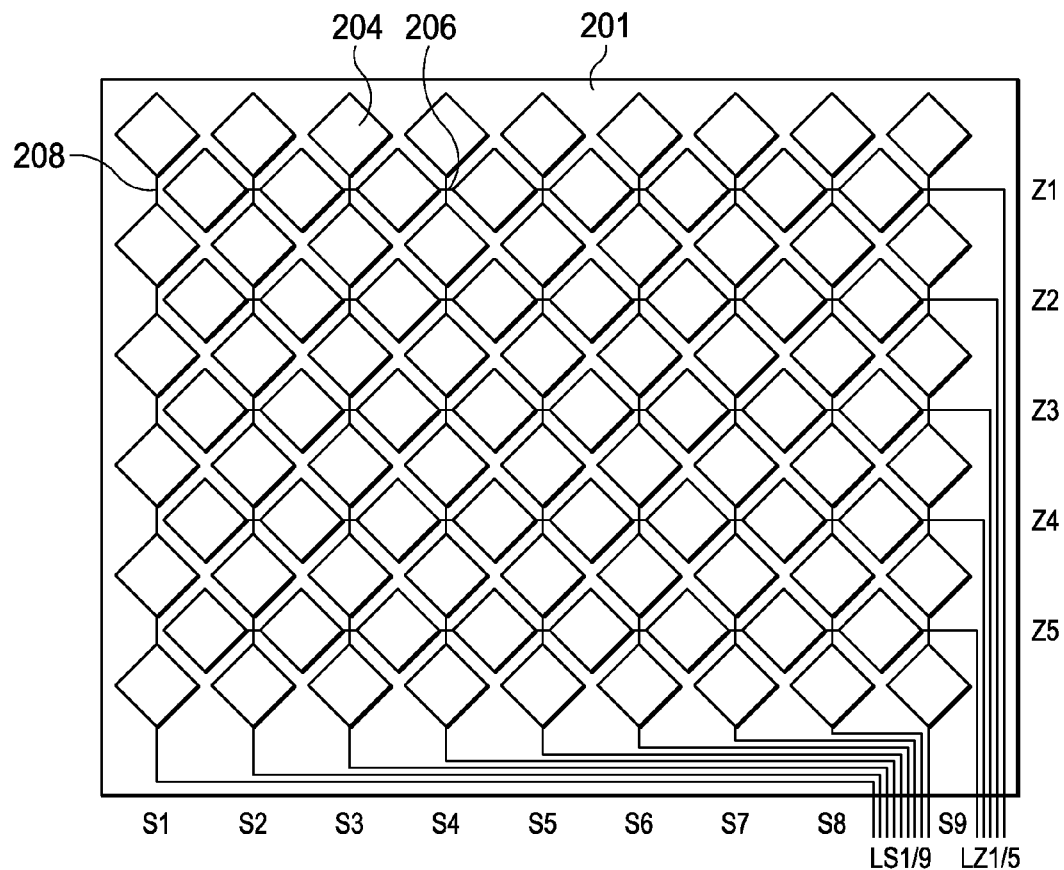
FIG. 4 is a top view of a general schematic representation of a touch-sensitive display combined with contact-free detection means, which is in accordance with some embodiments.
Figure 7:
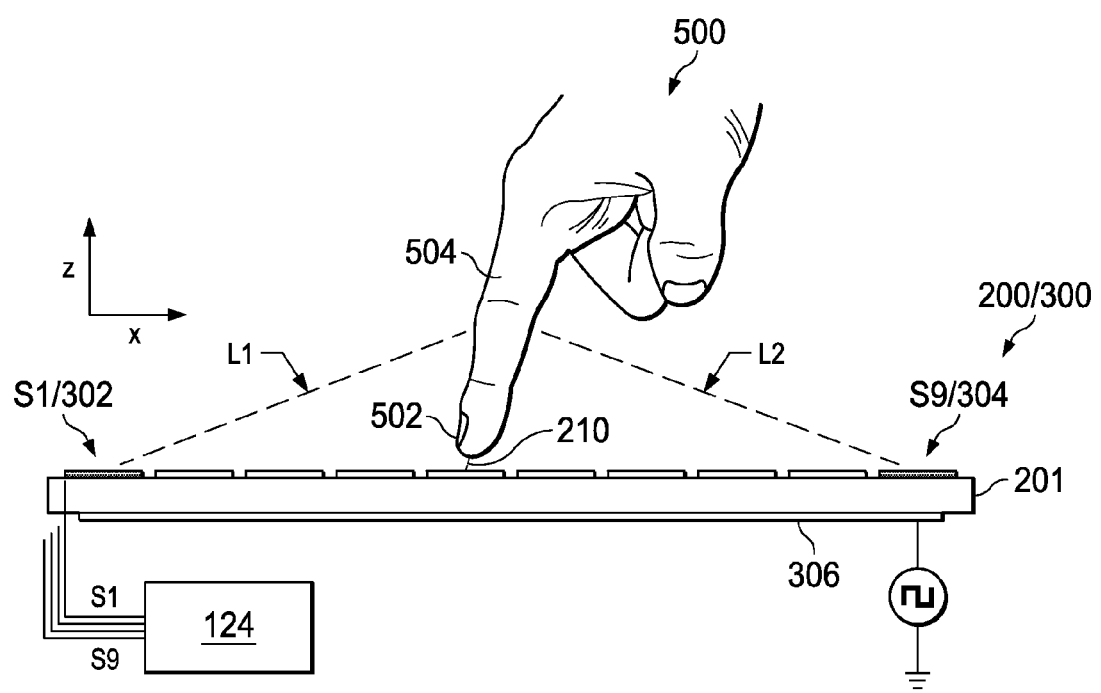
FIG. 7 is a side view of a general schematic representation of a touch-sensitive display combined with contact-free detection means, which is in accordance with some embodiments.

In some embodiments, the first position is substantially the geometric mean position of where the user input object 500 contacts the touch sensitive module 200. The geometric mean position is calculated by weighting the change in capacitance induced by the user input object 500 at each capacitive sensor element 204 of the surface (FIG. 4). Where the user input object 500 contacts the touch-sensitive module 200 is the contact area 210 (FIG. 7). Here, the positional information is determined by use of capacitive sensor technology. Multiple capacitive sensors elements 204 are arranged on the touch-sensitive module 200. The user input object 500 (e.g., in the form of a user finger) makes contact with the touch-sensitive surface 200. Then, different changes in the electric field of the capacitive sensor elements 204 are induced and measured by capacitive sensor elements 204. From these different changes measured by capacitive sensor elements 204 arranged at different locations on the touch-sensitive module 200, the geometric mean contact position is calculated and/or determined. For this purpose, a map may be created indicating the location of all capacitive sensor elements 204 and indicating the changes in capacitance induced by the user input object 500 at each sensor element 204. The geometric mean position may be calculated by determining the geometric mean, i.e., the mean position of all positions where a capacitance change was observed. The geometric mean position may also be calculated by determining the geometric mean weighted by the magnitude of capacitance changes.

In some embodiments, the second position is substantially the geometric mean position of a portion of the user input object 500 that is within the predefined distance D of the touch sensitive module 200 weighted by the electrical properties of the user input device 500. However, the mean position of the user input object 500 may also merely indicate a point in space that is representative of the spatial configuration of the user input object 500. Regardless of what the second position represents, it must be determined from the second positional information. Here, the contact-free detection is based on capacitive sensor technology, the mean position of the user input object 500 is determined by analyzing the electrical influence of the user input object on the electric field of corresponding electrical field generation and detection electrodes. Methods for doing so are known from WO 2011/128116 A2, DE 10 2007 020 873 A1, and DE 10 2010 007 455 A1, each of which is hereby incorporated by reference.

In some embodiments, the first positional information is determined and represented in two dimensions because the first positional information depends (solely) on the contact area 210 between the user input object 500 and the touch-sensitive module 200. Any touch event is described by two coordinates representing a position on the touch-sensitive surface. In some embodiments presently discussed, the first positional information comprises the first position in the form of a 2-tuple.

In some embodiments, the second positional information is determined and represented in three dimensions because the second positional information depends on the spatial configuration of the user input object in three-dimensional space. Any spatial configuration of an object can be described by three coordinates and, if necessary, a scalar value. A preferable embodiment of such a description is a three-dimensional scalar field. Another preferable embodiment of such a description would be 3-tuple (also referred to as triplet) representing, for example, the second position. In some embodiments presently discussed, the second positional information comprises the second position in the form of a 3-tuple.

In some embodiments, both the first positional information and the second positional information are determined and/or represented in the same coordinate system. For this purpose, the first positional information is transformed into the coordinate system of the second positional information. Likewise the second positional information could be transformed into the coordinate system of the first positional information, or both first and second positional information could be transformed into another coordinate system.

In some embodiments, both the first positional information, the second positional information, the first, and the second position are determined relative to a fixed reference position on the touch-sensitive module 200.

In some embodiments, the electronic device 100 further comprises a gesture recognition module 138 (FIG. 3) that is a separate software module in the memory 102 of the electronic device 100. The gesture recognition module 138 is adapted for identifying a gesture as belonging to a predefined gesture category from the first and the second position determined by the controller means 120. The electronic device 100 is adapted for transitioning from a first state into a second state when or after a predefined gesture is identified by the gesture recognition module 138. The electronic device 100 may assume a plurality of states. A state refers to, for example, a state of a graphical user interface presented by the electronic device, to a state of an application (such as applications regarding text editing, messaging, graphic editing, emailing, music playing, or game playing), or to locked state. Via the user interface, the user may interact with the electronic device and make it transition from a first into a second state.

In some embodiments, the gesture recognition module is adapted for: storing and/or obtaining multiple predefined gesture category, recording a gesture from: the first position and the second position determined by the controller means 120, wherein identifying the recorded gesture as belonging to at least one of the multiple predefined gesture categories, extracting a parameter from the identified gesture, such as a zoom factor, or a discrete rotation angle, wherein a gesture is a trajectory in a phase space, the phase space being defined by all possible states of the first and the second positional information and/or of the first and the second position, i.e., by those states that the first and the second positional information and/or the first and the second position may assume.

In some embodiments presently discussed, the gesture is recorded by the gesture recognition module 138 as long as the user input object touches the touch-sensitive module 200. This is advantageous because the start and end of the gesture is unambiguously defined both for the user performing the gesture and the gesture recognition module 138 recording the gesture.

FIG. 3 is a more detailed schematic representation of an example electronic device 100. In this example, which is not to be considered as limiting the invention to the precise forms disclosed, the device 100 includes a memory 102, a memory controller 104, one or more processing modules (CPU's) 106, a peripherals interface 108, RF circuitry 112, audio circuitry 114, a speaker 116, a microphone 118, an input/output (110) subsystem 120, a touch-sensitive display 126, contact-free detection means 128, and an external port 148. These components communicate over the one or more communication buses or signal lines 110. The device 100 can be any electronic device, including but not limited to a handheld computer, a tablet computer, a mobile phone, a media player, a personal digital assistant (PDA), or the like, including a combination of two or more of these items. It should be appreciated that the device 100 is only one example of an electronic device 100, and that the device 100 may have more or fewer components than shown, or a different configuration of components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. The memory 102 may further include storage remotely located from the one or more processors 106, for instance network attached storage accessed via the RF circuitry 112 or external port 148 and a communications network (not shown) such as the Internet, intranet(s), Local Area Networks (LANs). Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data. The peripherals interface 108, the CPU 106, and the memory controller 104 may be implemented on a single chip, such as a chip 111. They may be implemented on separate chips.

The RF (radio frequency) circuitry 112 receives and sends electromagnetic waves. The RF circuitry 112 converts electrical signals to/from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators. a digital signal processor, a CODEC chipset, a subscriber identity module (SIM) card, memory, and so forth. The RF circuitry 112 may communicate with the networks, such as the Internet, also referred to as the World Wide Web 0NVVW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoiP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker converts the electrical signal to human-audible sound waves. The audio circuitry 114 also receives electrical signals converted by the microphone 116 from sound waves. The audio circuitry 114 converts the electrical signal to audio data and transmits the audio data to the peripherals interface 108 for processing. Audio data may be may be retrieved from and/or transmitted to the memory 102 and/or the RF circuitry 112 by the peripherals interface 108. The audio circuitry 114 may also include a headset jack (not shown). The headset jack provides an interface between the audio circuitry 114 and removable audio input/output peripherals, such as output-only headphones or a headset with both output (headphone for one or both ears) and input (microphone).

Controller means in the form of the I/O subsystem 120 provide the interface between input/output peripherals on the device 100, such as the touch-sensitive display 200 and the contact-free detection system 300. The I/O subsystem 120 includes a touch-sensitive-display controller 122 and a contact-free detection controller 124.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components may include an operating system 132, a communication module (or set of instructions) 134, a gesture recognition module (or set of instructions) 138, a graphics module (or set of instructions) 140, a user interface state module (or set of instructions) 144, and one or more applications (or set of instructions) 146.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The gesture recognition module 138 is adapted to receive first and second positional information, in particular the first and the second position, from the (I/O) subsystem 120. The gesture recognition module 138 includes various software components for performing various operations related to analyzing the first and second positional information, in particular the first and the second position, such as determining if contact has occurred, determining if there is movement of the first and the second position and tracking said movement, and determining if the contact has been broken (i.e., if the contact has ceased). Determining movement may include determining speed (magnitude), velocity (magnitude and direction), and/or an acceleration (including magnitude and/or direction) of the first and the second position.

The graphics module 140 includes various known software components for rendering and displaying graphics on the touch-sensitive display 126. Note that the term "graphics" includes any object that can be displayed to a user, including without limitation text, web pages, icons (such as user-interface objects including soft keys), digital images, videos, animations and the like.

The electronic device state module 144 controls the electronic device state of the device 100. The electronic device state module 144 may include a first state module 150 and a second state module 152. The first state module detects satisfaction of any of one or more conditions to transition the device 100 to a first state and to transition the device 100 to the first state. The second state module detects satisfaction of any of one or more conditions to transition the device to an electronic device second state and to transition the device 100 to the second state.

The one or more applications 130 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

FIGS. 4-7 provide a more detailed schematic representation of an example embodiment of contact-free detection means 300 that are an integral part of the touch-sensitive module 200 in the form of a touch-sensitive display. This touch sensitive display allows for detecting first positional information and second positional information simultaneously and/or alternately, wherein this touch-sensitive display is characterized by a robust and low-cost design.

FIG. 4 shows a simplified touch glass of a touch-sensitive module 200, which includes a screen layer 201 that consists of a transparent and isolating material. On this screen layer 201, a transparent electrode layer is arranged that is connected to the screen layer.

This electrode layer is divided into multiple electrode segments 204, wherein an electrode segment 204 is a capacitive sensor element 204. The entirety of all electrode segments 204 forms the here-shown active area 202 in the form of segment array 202. This segment array 202 forms segment lines Z1, Z2, Z3, Z4, and Z5, as well as segment columns S1, S2 . . . S9, namely due to the fact that the corresponding horizontal and/or vertical consecutive neighboring electrode segments 204 are connected to each other by small conductive sections 206, 208. The segment lines Z1 . . . Z5 and the segment columns S1 . . . S9 are isolated with regard to each other, each of them being connected to a supply line LZ1/5 and LS1/9. The conductive sections 206, 208 are—insofar as they intersect each other in the area 202 of the touch-sensitive module 200-isolated against each other.

The segment columns and segment lines are connected to controller means 120, in particular the contact-free detection controller 124, via these supply connections LZ1/5 and LS1/9. In combination with the contact-free detection controller 124, and an additional conductive layer 306, the touch glass of the touch sensitive module 200 also represents the contact-free detection system 300. These controller means 120, 124 are designed so that they simultaneously (by means of frequency-division-multiplexing) and alternately (by means of time-division-multiplexing or event triggered multiplexing) may determine first and second positional information regarding a user input object 500, wherein the contact-free detection is performed by combining multiple electrode segments 204 of the segment array 202 to electrode groups 301, 302, 304, 304, in particular electrode line Z1 . . . Z5 or electrode column S1 . . . S9.

As shown in FIG. 4, an electrode segment may also have a linear configuration.

Figure 5:
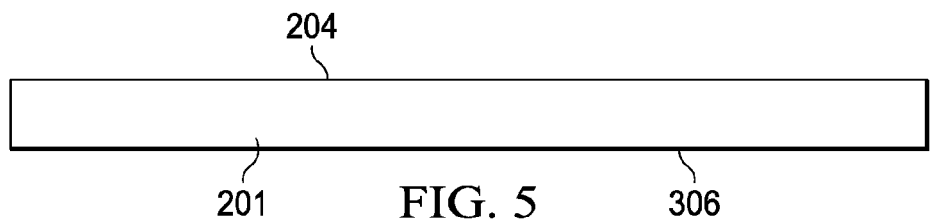
FIG. 5 is a side view of a general schematic representation of a touch-sensitive display combined with contact-free detection means, which is in accordance with some embodiments.

In FIG. 5, the design of the glass 201 of a touch-sensitive display is schematically shown as a simplified example. The screen layer 201 preferably consists of plastic or glass material and has thickness of, for example, 0.8 mm. On both sides of the screen layer 201, a transparent conductive layer 204, 306 (e.g., ITO layer) is provided.

The top surface oriented towards the user in a use position has a layer 204 that is structured and thereby divided into a plurality of segments 204, the layer hereby having closely neighbored segments 204 (e.g., rhombi) that are grouped into lines and columns. Electrically contacting the electrode segments 204 grouped into rows and columns is performed via a dedicated supply lines.

The bottom side (oriented towards the display) is continuously coated with a transparent ITO layer 306. The accordingly-constructed screen layer 201 is arranged in front of a suitable display in order to provide this display with known touch-sensitive display functionality. Each of the electrode layers 204, 306 may be covered by further (here not shown) isolating transparent layers. The electrode layers 204, 306 are typically connected via Flexicables (FFC).

Figure 6:
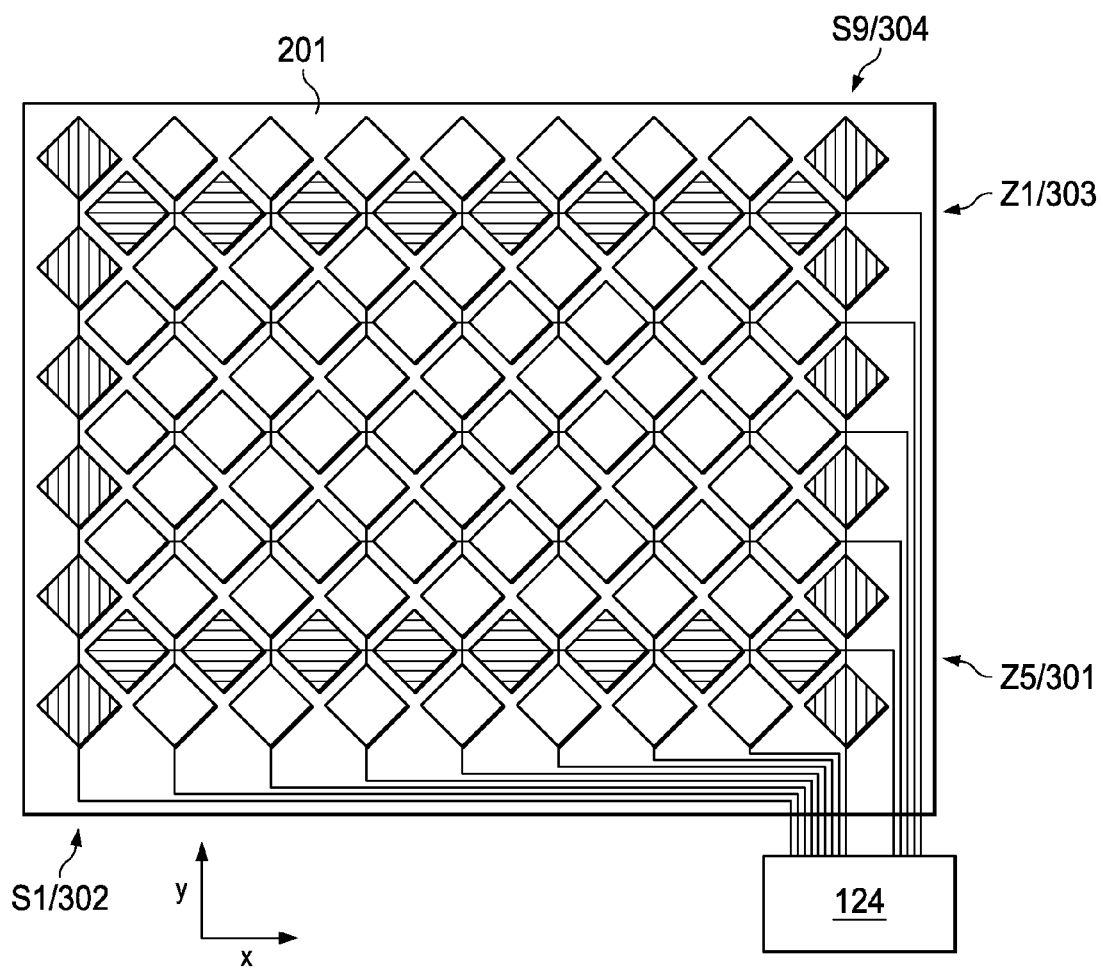
FIG. 6 is a top view of a general schematic representation of a touch-sensitive display combined with contact-free detection means, which is in accordance with some embodiments.

As shown in FIG. 6, four of the rhombus lines close to the edge (i.e., segment lines Z1/303 and Z5/301 formed by horizontal grouping, segment columns S1/302 and S9/304 formed by vertical grouping) are used for determining second positional information. By using electrode segments grouped into lines and columns, a "frame" of electrodes for contact free detection means is obtained.

The upper horizontal electrode segment group Z1/303 and the lower horizontal electrode segment group Z5/301, as well as both left and right electrode columns S1/302 and S9/304 (close to the edge) used for determining second positional information are highlighted by shading. Both the horizontal electrode segment group Z1/303 and Z5/301 are employed for determining the y-position of a mean position of a user's finger 500. Simultaneously or directly following the y-position determination, an analysis may be performed, by means of which, by grouping electrode segments, an elongated detection electrode is formed each in the left edge area S1/302 and in the right edge area S9/304. By those two electrode groups S1/302, S9/304, an x-position of the mean position of the user's finger 500 may be determined. Further, the z-distance of the mean position of the user's finger is calculated from the measured signals. For determining the mean position, other analysis approaches may be employed.

It is possible to have further electrodes, in the display area that assist the determination of the second positional information. By means of these additional electrodes, for example, the predefined distance may be enlarged, so that portions of the user input object (such as the user hand) contribute to the spatial arrangement determined by the contact-free detection means.

In an electronic device featuring such a display, first and second positional information may be determined simultaneously and/or alternately. For this purpose, multiplexing, in particular event triggered multiplexing, time-division-multiplexing and/or frequency-division-multiplexing, is employed.

The controller means 120, in particular the contact-free-detection controller 124, comprise a group-driver, wherein the group driver determines which electrode segment group or combination of groups Z1/303, Z5/301, S1/302, S9/304, (or, if necessary, which single electrode segments 204) are currently employed for determining the second positional information. The group-drive may forward information regarding the current electrode segment grouping to a compensation controller, which as such imposes specific characterizing values or preferences and reference levels, which are taken into consideration for analyzing the electric field phenomena detected via the electrode segment groups Z1/303, Z5/301, S1/302, S9/304. These characterizing values may be the total capacity or the normal ground of the currently active electrode system in a configuration, wherein no external influence (such as external influences resulting from the user input object) persist. The characterizing values may then be considered as calibration values. The compensation controller may be a separate entity or an integral part of the contact-free-detection controller 124.

The controller means 120, in particular the contact-free-detection controller 124 for temporarily activating electrode segment lines and columns and for analyzing the signals measured via the activated electrode segment lines and columns, may be implemented as ASIC 120/124. ASIC 120/124 may be arranged close to the screen layer 201 and may be physically connected to the screen layer 201. ASIC 120/124 may be designed so that it is adapted for simultaneously and/or alternately determining the first positional information via the touch-sensitive module 200 and the second positional information via the contact free detection means 300. ASIC 120/124 may be designed so that certain functions thereof may be defined by programming ASIC 120/124. ASIC 120/124 may be designed so that ASIC 120/124 defines which electrode segment groups (in particular which electrode segment lines Z1 . . . Z5 and electrode segment columns S1 . . . S9) of the electrode segment array are currently employed for determining second positional information.

ASIC 120/124 itself provides the signals regarding the first positional information (in particular regarding the first position) in the way prior art touch-sensitive surfaces would do. In addition, the ASIC 120/124 provides the signals regarding the second positional information (in particular regarding the second position). In the ASIC 120/124, an application may be running that performs a specific pre-analysis regarding the determined first and second positional information. ASIC 120/124 may use the first positional information and, depending thereon, may choose electrode segment groups that should be employed for determining second positional information. This is advantageous because the precision of determining the second positional information may be improved by choosing appropriate electrode segment groups. ASIC 120/124 may determine second positional information by analyzing changes of the capacitive coupling against ground, coupling-in of a potential, and/or the change of dielectric properties of the environment of the activated electrode segment group(s), which may, for example, be induced by moving a user input object within the predefined distance on front of touch-sensitive surface 200. Different measurement approaches may be employed by the ASIC 120/124 for this purpose. A typical measurement approach consists in, for example, detecting coupling of the activated electrode segments against a ground potential as an analogue signal (i.e., a signal varying within a certain range).

The contact-free-detection controller 124 may comprise RX and TX connectors. It is possible, for example, by channel-multiplexing, to employ a plurality of electrode segments chains for determining second positional information. Analysis of the signal levels at the corresponding electrode segment chains may be performed in that a multi object recognition is performed (e.g., the recognition of two finger tips and corresponding determining of first and second positional information for each of the finger tips).

In FIG. 7, a touch-sensitive module 200 combined with a contact-detection system 300 according to the example embodiments is shown, wherein the determination of the first and second positional information is displayed in more detail. By means of the electrode segments that are close to the edge and grouped into segment columns S1/302 and S9/304, signal levels are detected, which are indicative for the distances L1, L2 of the mean position of the user's finger 500 with regard to the touch-sensitive module 200. From these signal levels, the x- and z-distance of a mean position of the user's finger 500 is calculated. The signal detection is performed by means of a group-driver that successively connects specific electrode segment groups of the touch-sensitive module 200 with the controller means 120, in particular with the contact-free detection controller 124. The latter comprises one or more analogue-to-digital converter (ADC) and calculates the first and second positional information from the accordingly obtained digital second signal positional information. The touch-sensitive display has an ITO layer 306 arranged on the back side, which is opposite to the side having the electrode segments 204 arranged thereon. A square-wave signal is applied to the ITO-layer 306 arranged on the back side.

Since the electrode setup of the touch sensitive module 200 is very similar to the typical electrode setup of a contact free detection means 300, the sensitive surface may be used for both touch detection as well as contact free detection of a user object.

The electrode segments of the electrode array may be implemented in a transparent multi-layer screen structure. For achieving particularly reliable isolation of the intersecting points between the electrode segments, the electrode segments forming electrode segment lines may be arranged in a different layer than the electrode segments forming electrode segment columns, and/or the electrode segments forming electrode segment lines and the electrode segments forming electrode segment columns are arranged on opposite sides of one layer. Further, on the side that is facing away from the user during use, a back electrode 306 (which, for example, may serve as transmitting electrode for the contact free detection) may be formed by the VCOM layer.

Hand Posture Control

Figure 8:
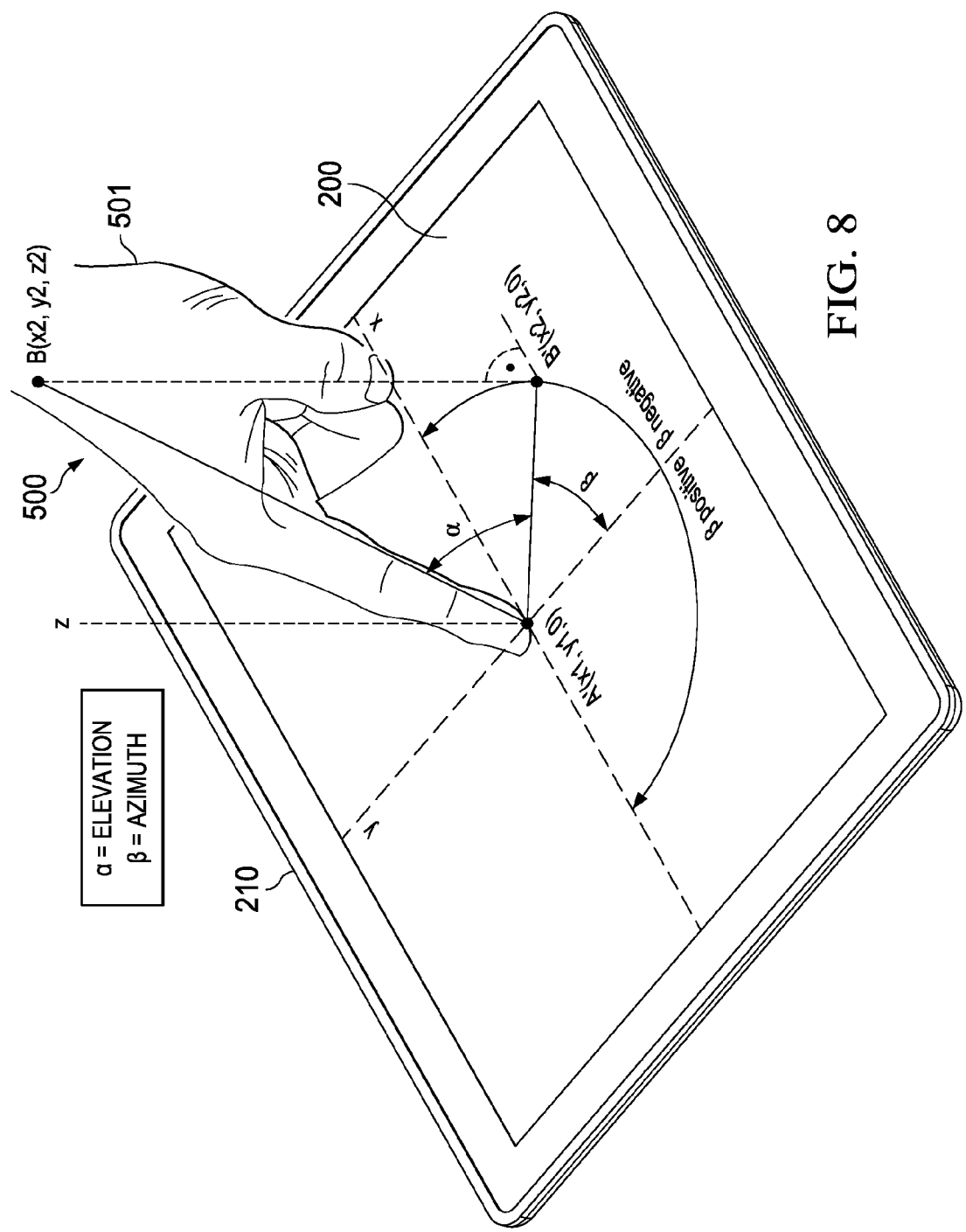
FIG. 8 illustrates an exemplary environment for hand posture control.

As noted above, embodiments may make use of a sensor system such as described above for hand posture control of an electronic device 100 and in particular, using characteristic parameters associated with position such as gestures or hand posture or orientation to control an electronic device. Turning now to FIG. 8, a diagram illustrating an exemplary environment for applying such methods is shown. Shown are a touch sensitive module 200 and a hand 501 and associated finger 500. The finger 500 touches a contact area or touch position 210 of the touch sensitive module 200. The contact area 210 defines point in a three-dimensional coordinate system. In particular, the contact area 210 defines a point A having coordinate (x1, y1, 0). The hand 501 has a center of gravity at B having coordinate (x2, y2, z2). The center of gravity is a point of "concentration" for the sensors—for camera-based sensors this is typically the geometric center; for capacitive and acoustic sensors this center point is typically the result of distance measurements and trilateration, as discussed above. The center of gravity B defines an angle of elevation α with respect to the touch sensitive module 200, and an angle on the touch sensitive surface, referred to as the azimuth β.

According to various embodiments, the touch location of the finger A(x1, y1, 0) and also the center of gravity of the user's hand in B (x2, y2, z2) are detected. By touching the display's touch panel surface with one finger it is possible to change the center of gravity of the hand by moving the hand up and down (elevation α), or describing a circular motion with the hand around the touchdown point of the finger (azimuth β). That is, depending on the embodiment, a change in the elevation or a change in the azimuth may be used to control the user interface.

Figure 9:
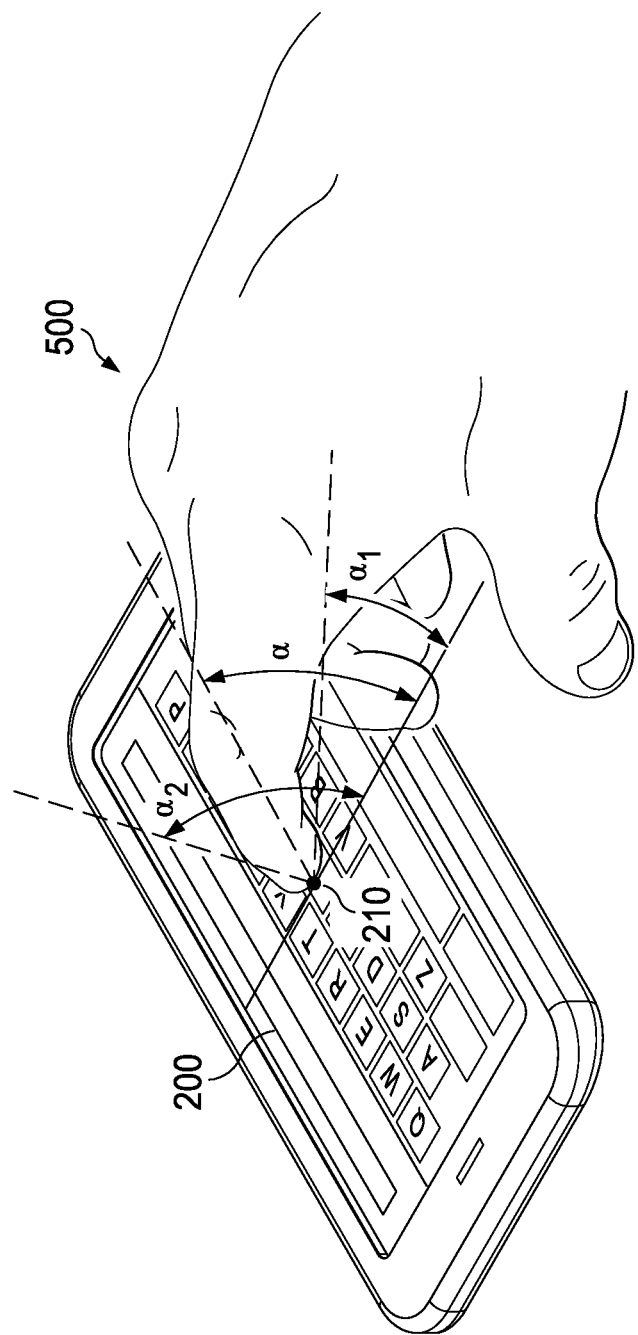
FIG. 9 illustrates finger elevation control.

For example, shown in FIG. 9 is finger 500 at contact area 210 on touch screen module 200 and, in particular, on a key of a touch screen keypad or keyboard. The finger 500 defines an elevation angle α.

In some embodiments, characters are written (i.e., corresponding keys are selected) as soon as the finger 500 touches the key on the touch screen. At the moment of the touch, the angle of elevation α controls the case of the characters. For example, in some embodiments, as shown with elevation angles α1, α2, characters are written in lower case by a flat elevation (e.g., elevation α=0–50°, while characters are written in upper case if the angle is elevated (e.g., α>50°). Alternatively, this method can be used for the input of special characters instead of controlling the case sensitivity.

Figure 10:
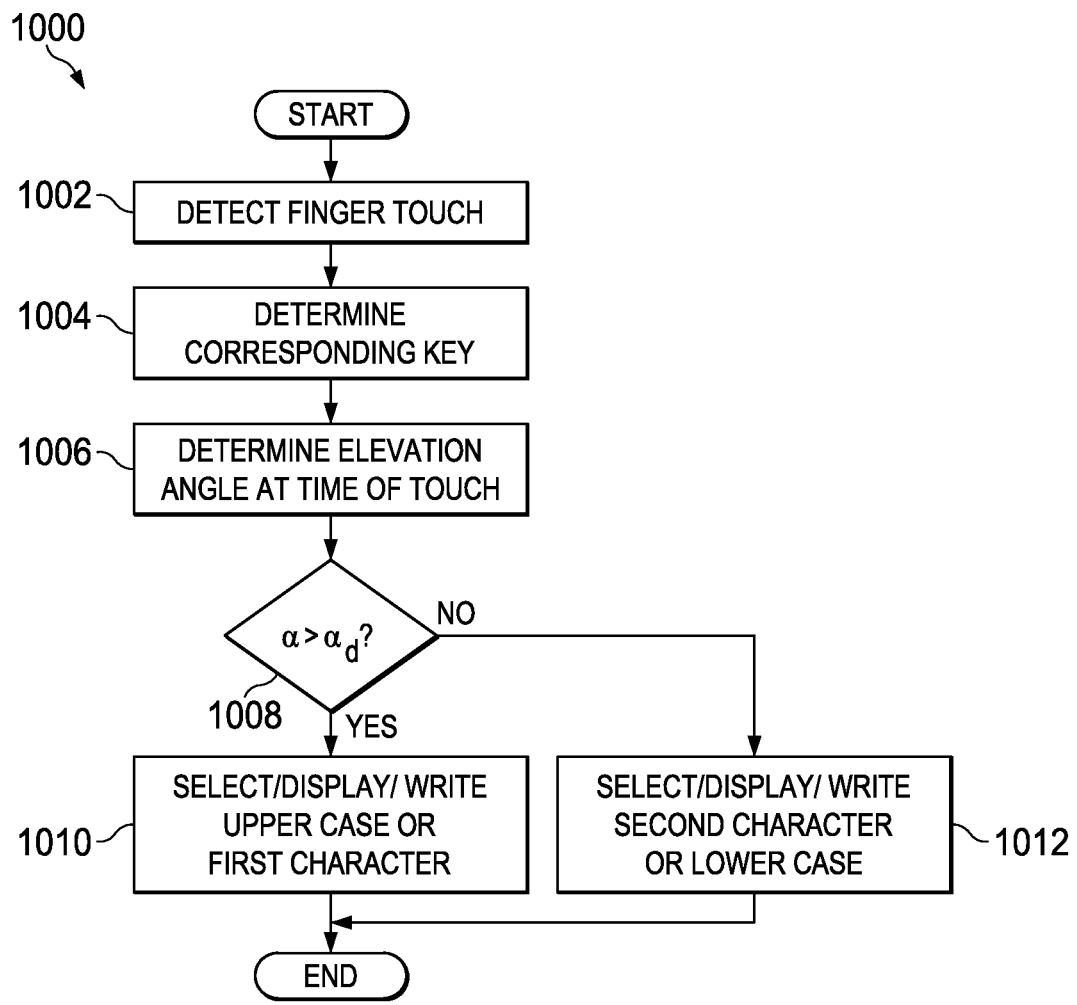
FIG. 10 is a flowchart illustrating operation of embodiments with absolute angle control.

For example, turning now to FIG. 10, a flowchart 1000 illustrating such an embodiment is shown. The particular arrangement of elements in the flowchart 1000 is not meant to imply a fixed order to the elements; embodiments can be practiced in any order that is practicable.

Initially, the system detects a finger or stylus touch (step 1002). Next, a key corresponding to the x-y position of the touch will be determined (step 1004). The elevation angle α at the time of the touch is also determined (step 1006). The system will further determine if the elevation angle α is greater than a predetermined elevation angle αd (step 1008). Such a predetermined elevation angle αd may be any suitable angle, such as, for example, 45-50 degrees, although other angle values may be used. If the elevation angle is larger than the predetermined elevation angle, then a first predetermined character may be displayed or selected or written to the display (step 1010). For example, the character may be an uppercase character corresponding to the key selected. If the elevation angle was less than the predetermined elevation angle, then a second character may be selected, displayed, or written to the display (step 1012). For example, the character may be a lowercase character corresponding to the key selected. It is noted that, although discussed in terms of two characters, other embodiments may be used to select between more than two characters, for example, by using more than one threshold.

In another embodiment, a change of elevation α during the actual touch is used to control alternative input schemes (e.g., upper or lower case). For example, if the elevation angle remains constant during the touch, characters are written in lower case. If the elevation is increased to a higher value α1, or decreased to a lower value α2, the corresponding character is written in upper case.

Figure 11:
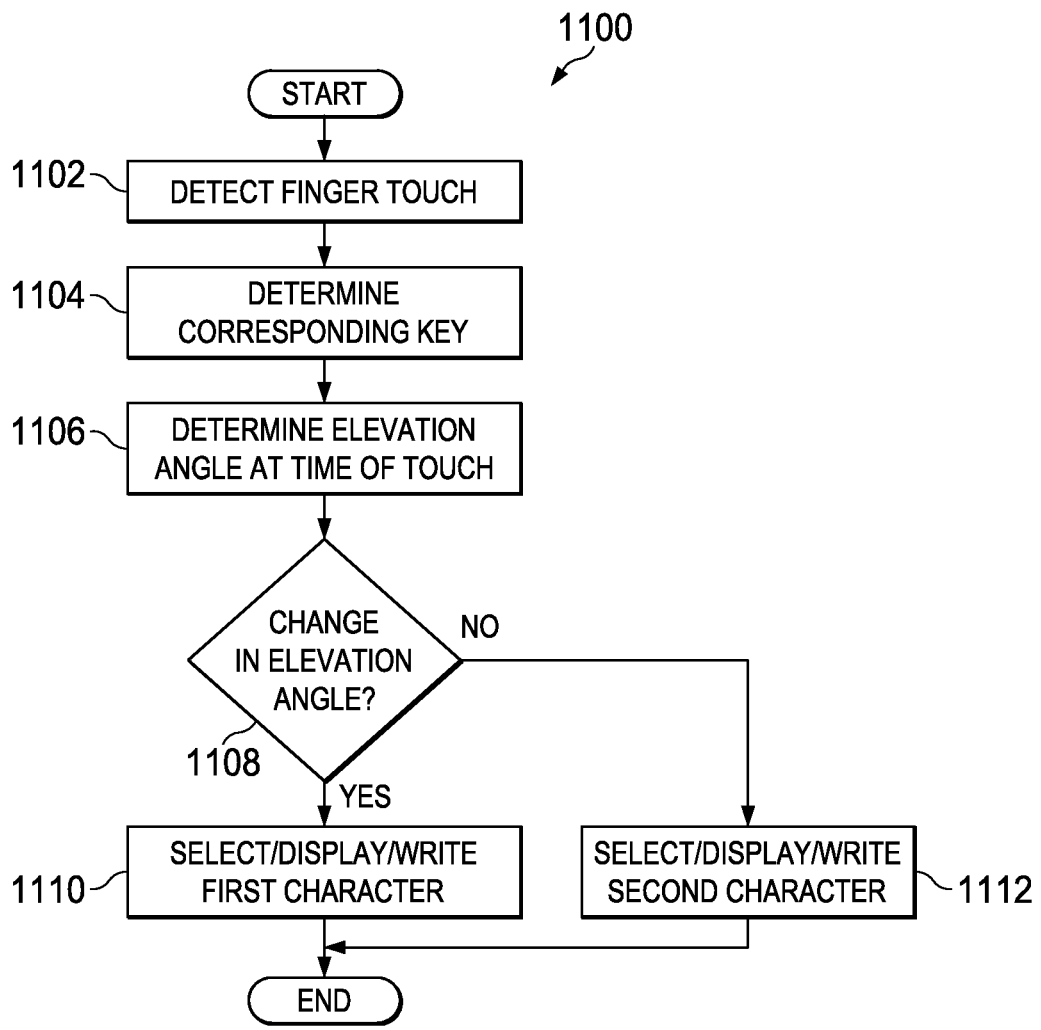
FIG. 11 is a flowchart illustrating operation of embodiments with relative angle control.

For example, turning now to FIG. 11, a flowchart 1100 illustrating such an embodiment is shown. The particular arrangement of elements in the flowchart 1100 is not meant to imply a fixed order to the elements; embodiments can be practiced in any order that is practicable.

Initially, the system detects a finger or stylus touch (step 1102). Next, a key corresponding to the x-y position of the touch will be determined (step 1104). The elevation angle α at the time of the touch is also determined (step 1106). The system will further determine if the elevation angle α changes during the touch (step 1108). A change during the touch may be a positive or negative change larger than a predetermined value with respect to the elevation angle determined at the time of the touch. If the elevation angle changes during the touch, then a first predetermined character may be displayed or selected or written to the display (step 1110). For example, the character may be an uppercase character corresponding to the key selected. If there is no change in the elevation angle, then a second character may be selected, displayed, or written to the display (step 1112).

For example, the character may be a lowercase character corresponding to the key selected. It is noted that, although discussed in terms of two characters, more than two characters may be selected, for example, by detecting more than one change in angle.

In other embodiments, the azimuth angle β is used in keyboard and/or character control. A change of azimuth during touch may be used to control alternative input schemes: If the azimuth remains constant during touch, normal characters are written when releasing the touch. If azimuth changes during touch, special characters are displayed in a magnifier and can be chosen by varying the angle.

Figure 12:
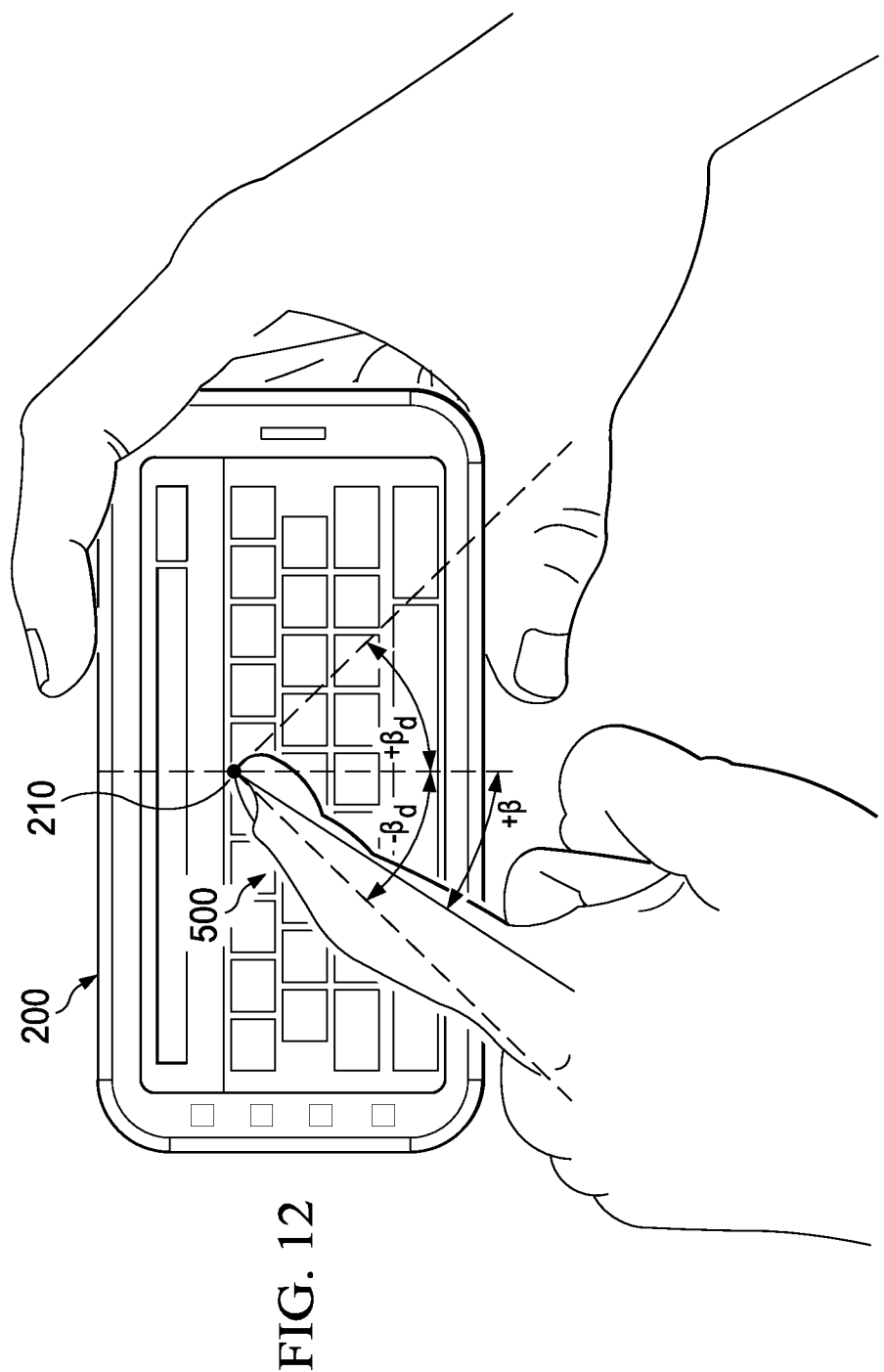
FIG. 12 illustrates azimuth control.

For example, shown in FIG. 12 is touch screen 200, finger 500, and point of contact 210. The finger 500 is at an azimuth angle β. In one embodiment, characters are determined as soon as the finger touches the touch screen. In the moment of the touch, the azimuth angle controls the case of the characters. In one embodiment, characters in lower case are written by a small azimuth angles (βd, −βd, e.g., azimuth=+30 . . . −30°. Characters in upper case are written if absolute value of the azimuth angle is greater than 30° (e.g. azimuth (βd, −βd)=−100° . . . −30°; +30° . . . 100°). Alternatively, this method can be used for the input of special characters instead of controlling the case sensitivity. Further, this method may be used to select between more than two alternatives.

Figure 13:
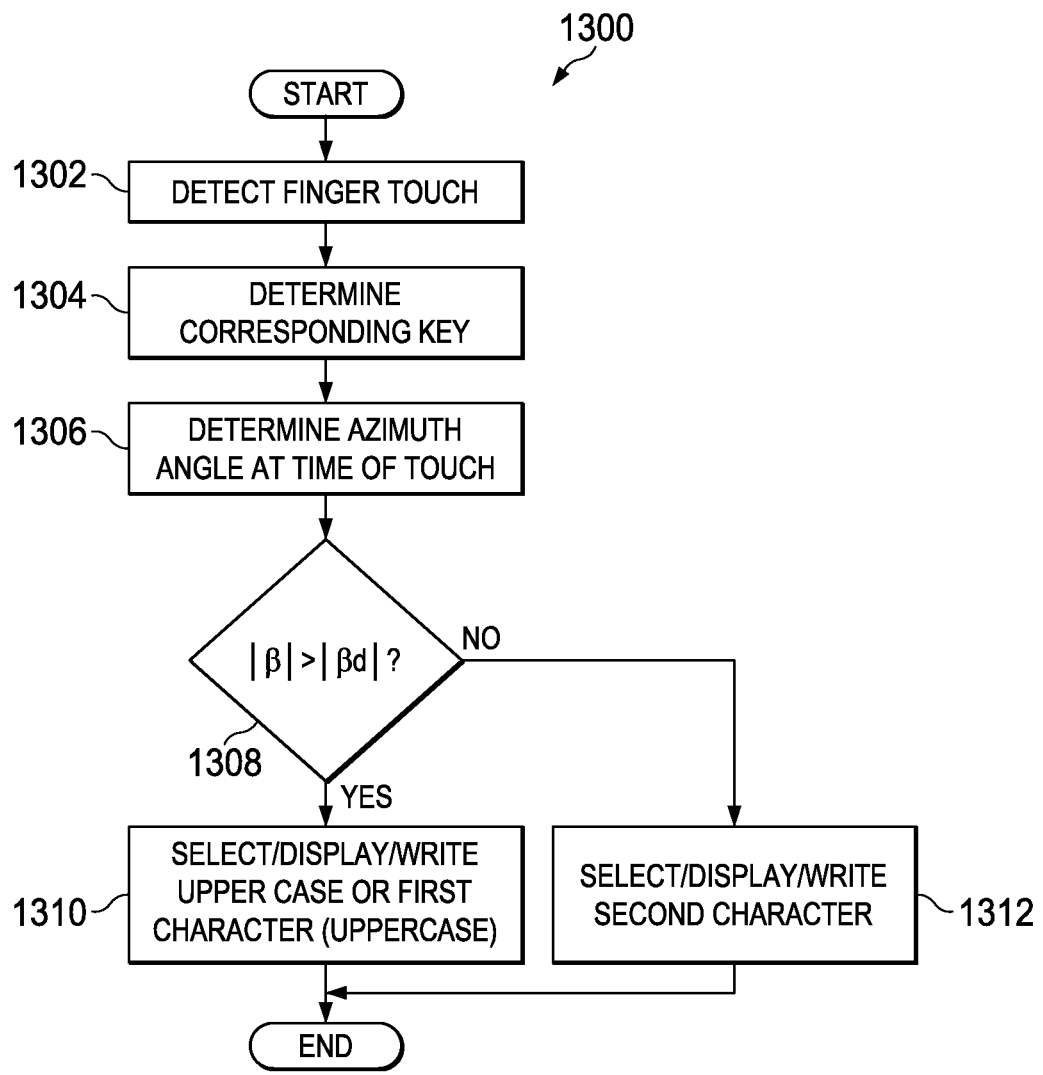
FIG. 13 is a flow chart illustrating azimuth control.

For example, turning now to FIG. 13, a flowchart 1300 illustrating such an embodiment is shown. The particular arrangement of elements in the flowchart 1300 is not meant to imply a fixed order to the elements; embodiments can be practiced in any order that is practicable.

Initially, the system detects a finger or stylus touch (step 1302). Next, a key corresponding to the x-y position of the touch will be determined (step 1304). The azimuth angle β at the time of the touch is also determined (step 1306). The system will further determine if the azimuth angle β is within a predetermined range or less than a predetermined value (step 1308). If the azimuth angle β is greater than an azimuth angle βd, then a first predetermined character may be displayed or selected or written to the display when the touch is released (step 1310). For example, the character may be an uppercase character corresponding to the key selected. If the azimuth angle β was less than the predetermined azimuth angle βd, then a second character may be selected, displayed, or written to the display (step 1312). For example, the character may be a lowercase character corresponding to the key selected. Again, it is noted that more than two alternatives may be selected, depending on the embodiments.

Figure 14:
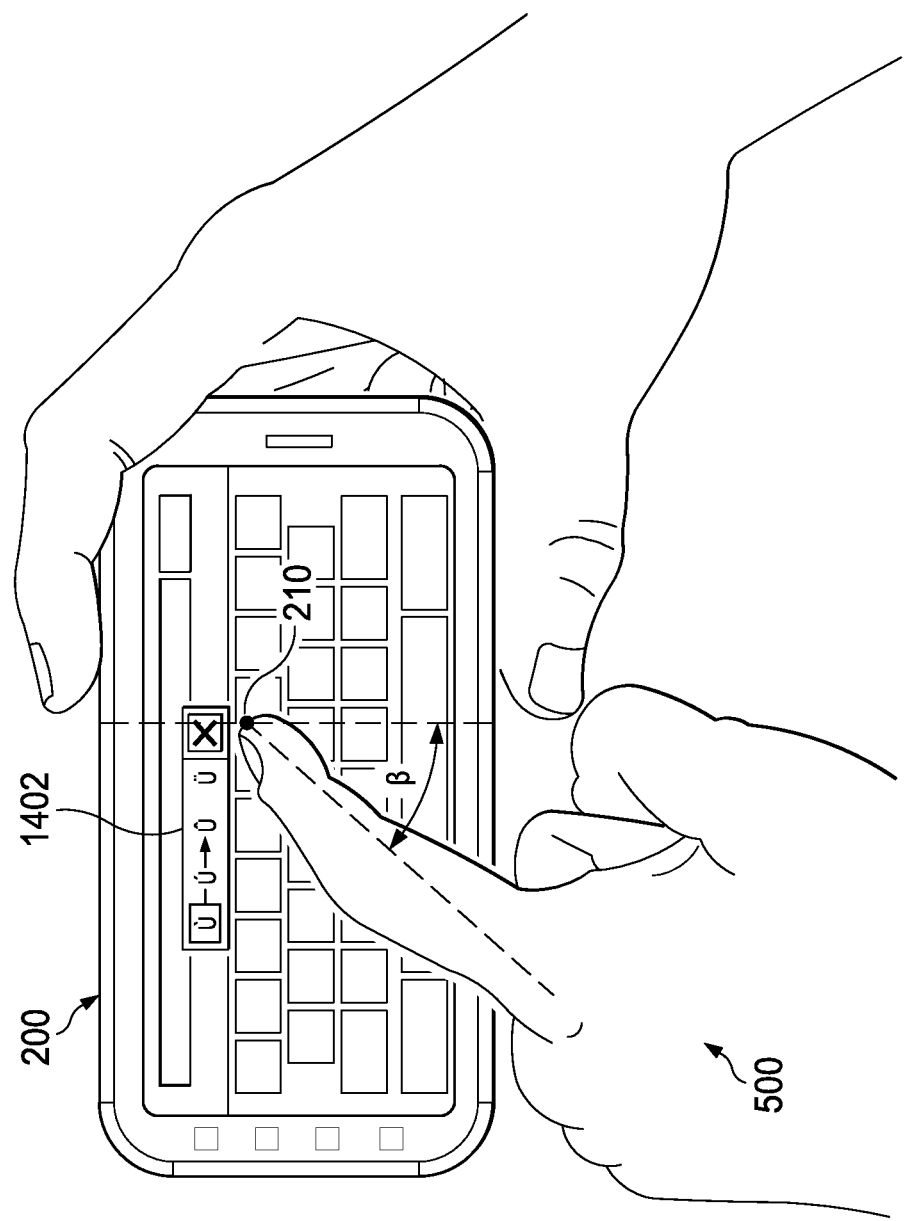
FIG. 14 illustrates an example of azimuth control.

As noted above, the azimuth and elevation angles may be used to select special characters. In some embodiments, one or the other may be used to aid in selecting more than one special character. Such an embodiment is shown in FIG. 14 with respect to using the azimuth to select more than one special character.

As shown, the user's finger 500 touches the screen 200 at point of contact 210 to select the character "ü." He does so with a low angle in elevation, which in the embodiment illustrated, selects lower case. As shown, the user may touch the character at a large negative azimuth angle β. This causes a pop-up window 1402 to be displayed. The selection of the character "ü." displayed in the pop-up-display 1402 is the character on the most left side—indicated by the rectangle. If the user released the touch in this position, he would write a "ü". However, if the user rotated the finger 500 to the right (anti clockwise), he can scroll through the shown characters to the right to highlight and select the desired variation.

Figure 15:
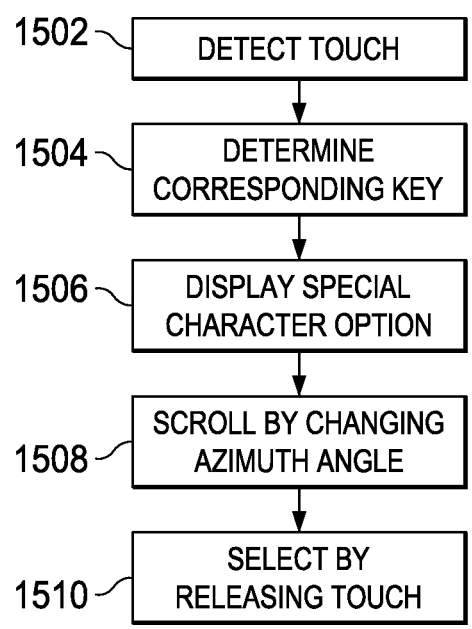
FIG. 15 is a flowchart illustrating the typical sequences of an azimuth controlled input method.

For example, turning now to FIG. 15, a flowchart 1500 illustrating such an embodiment is shown. The particular arrangement of elements in the flowchart 1500 is not meant to imply a fixed order to the elements; embodiments can be practiced in any order that is practicable.

Initially, the system detects a finger or stylus touch (step 1502). Next, a key corresponding to the x-y position of the touch will be determined (step 1504). Based on the elevation or the azimuth angle, a special character option display may be selected and presented for display (step 1506). For example, as noted above, if the elevation angle is relatively small and the azimuth angle is relatively large, the special character menu may be displayed. The special options menu may then be scrolled through by changing the azimuth angle of the finger (step 1508). For example, if the finger is rotated from left to right, the options in the menu may be sequentially highlighted. Once the desired option is highlighted, the user can select or display or write the selected character by releasing the touch (step 1510).

In some embodiments, a second function can be controlled by moving a 'second' finger or user input or selection device while the first finger or selection device is touching the keyboard. That is, in some embodiments, bringing a finger into the detection zone, or moving the finger within the detection zone, can control a shift key. Thus, the user does not need to hit an actual key—the shift control is done in the air by just moving one finger closer to the display or keeping it on the housing.

Figure 16A:
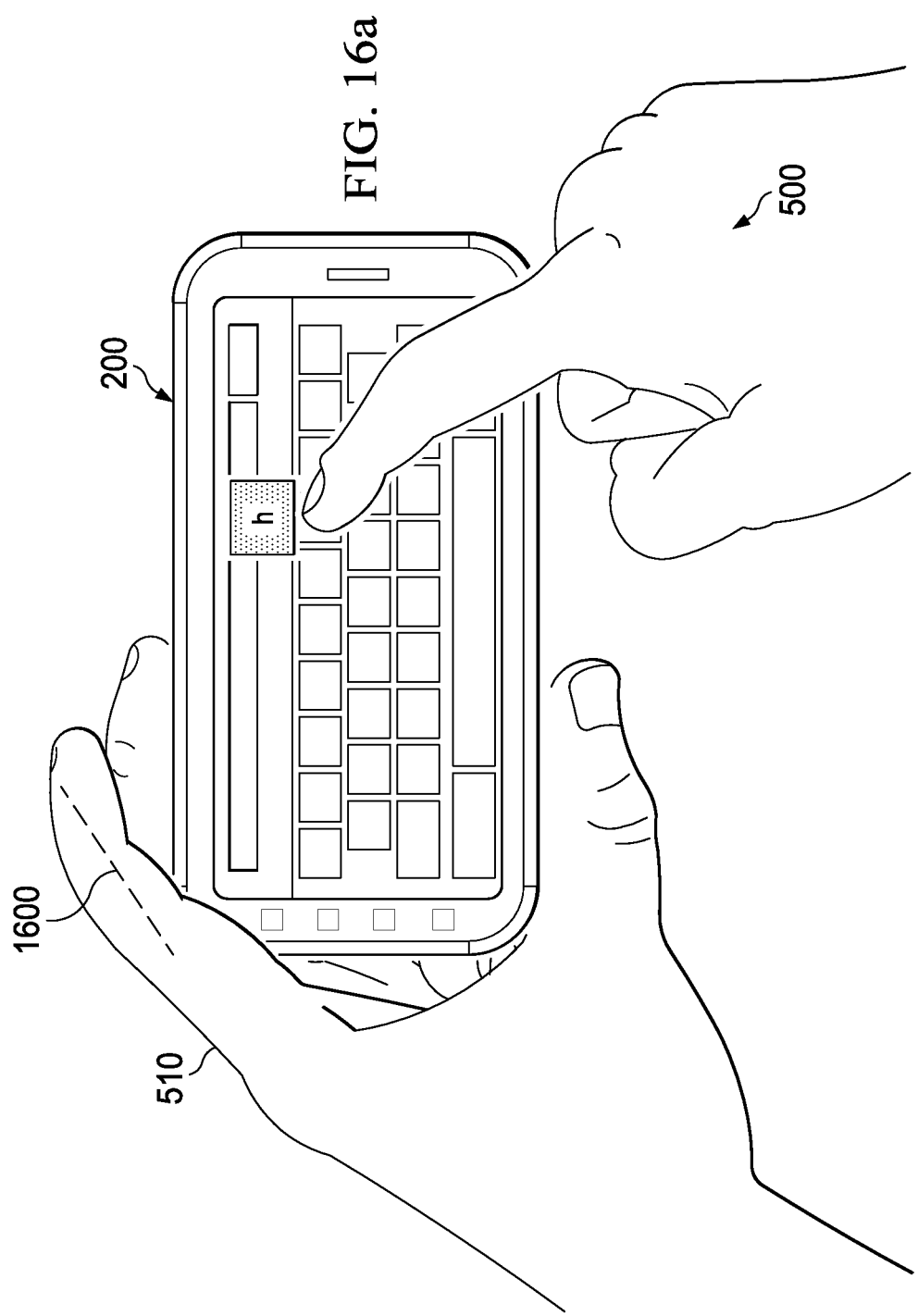

For example, as shown in FIG. 16a and FIG. 16b, a finger 500 may be used to select a letter or key (in the example illustrated, the letter "h."). The finger 510 is in a first position 1600. It can be moved to a second position 1602. When this is detected, the selected key toggles to an alternate, i.e., capital "H." This feature may be implemented in addition to or instead of any of the above-described embodiments.

Additionally or alternatively to the above mentioned options, a selection menu (not shown) may be configured to pop up in a manner similar to that of selection menu 1402 (FIG. 14) and present options such as proposals for auto completion (T9-like), auto correction, or further control commands (e.g., copy/paste of word). These may be selected by varying the angle of the finger. In some embodiments, a first proposal of auto completion can be chosen by a gesture like flicking with the hand in a certain distance over the keyboard. The advantage of using a gesture is to avoid pressing a small button on the keyboard. In such embodiments, a dictionary may be provided such that when touching and controlling via hand posture, typed text is immediately compared with the dictionary and proposals for auto-completions are made respectively. The dictionary proposals depend on the hand posture, in a manner similar to that discussed above.

Furthermore, in some embodiments, a grammar check can be added for best user comfort, making typing easier and quicker:

characters that do not make sense in the respective sequence can be suppressed;

no upper case as 2nd character;

always upper case as first character after a full stop.

The above explained options can also be combined.

The various embodiments open new valuable applications when combined with a gesture recognition integrated circuit capable of analyzing, for example, changes in an electric field generated by a transmission electrode and received by various receiving electrodes but also covering other hand posture detection methods (cameras, infrared, ultrasound). Hence, a main field of usage may be for touch screens and touch panels. However, other embodiments may apply as user interface simplification is an important revenue driver in consumer and other industries.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, and so on. Optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted

What is claimed is:

1. A gesture detection method, comprising:
   detecting a touch position of an input object by a touch detection unit;
   while the touch position is detected, selecting an input mode depending on characteristic parameters of the position of the input object or another input object, wherein the characteristic parameters of the position of the input object or the another input object are determined by a capacitive three-dimensional sensor system while the input object touches said touch position, wherein the capacitive three-dimensional sensor system comprises a transmission electrode and a plurality of detection electrodes arranged around the touch detection unit;
   entering an input character based on the touch position and either after calculation of the characteristic parameters or according to the release of the respective touch.

2. The gesture detection method according to claim 1, wherein an input mode is switched upon detection of a parameter change detected by the capacitive three-dimensional sensor system.

3. The gesture detection method according to claim 1, wherein said parameters are determined by an elevation angle of the input object performing a touch.

4. The gesture detection method according to claim 1, wherein said input object is a hand and said characteristic parameters are determined from a second hand holding a mobile device, wherein lifting of a finger of the second hand causes a change of the characteristic parameters.

5. The gesture detection method according to claim 1, wherein said input object is a hand and said parameters are determined by an azimuth angle of the hand performing the touch.

6. The gesture detection method according to claim 3, wherein a first elevation angle selects a first input mode and a second elevation angle selects a second input mode.

7. The gesture detection method according to claim 5, wherein a first azimuth angle selects a first input mode and a second azimuth angle selects a second input mode.

8. A gesture detection system, comprising:
   an input device including a capacitive touch sensitive surface comprising a plurality of electrodes arranged in rows and columns and a capacitive contact-free detection system, wherein the capacitive contact-free detection system is operable to select a most left and a most right column and a most upper and a most lower of the electrodes of the capacitive touch sensitive surface as receiving electrodes; and
   a controller configured to determine characteristic parameters for a position in three-dimensional space of a user input object using said capacitive contact-free detection system and select an operational mode of the input device based on the position of the user input object, wherein the position is determined by the capacitive touch sensitive surface.

9. A gesture detection system in accordance with claim 8, wherein the input device or the connected system includes a graphical user interface.

10. A gesture detection system in accordance with claim 9, wherein determining the position in three-dimensional space of the user input object includes determining an azimuth angle of the user input object and selecting a character on the graphical user interface based on the azimuth angle.

11. A gesture detection system in accordance with claim 9, wherein determining the position in three-dimensional space of the user input object includes determining an elevation angle of the user input object and selecting a character on the graphical user interface based on the elevation angle.

12. A gesture detection system in accordance with claim 9, wherein the controller is configured to determine a position in three-dimensional space of a second user input object using said capacitive contact-free detection system and select an operational mode of the input device based on the position of the second user input object.

13. A gesture detection system in accordance with claim 9, wherein the operational mode of the input device includes displaying an options menu based on the position in three-dimensional space of the user input object.

14. A gesture detection system in accordance with claim 9, further comprising a dictionary accessible responsive to detection of typed text and the position in three-dimensional space of the user input object.

15. A gesture detection system in accordance with claim 14, further configured to provide one or more auto-completion options from the dictionary associated with the typed text based upon the position in three-dimensional space of the user input object.

16. An electronic device, comprising:
an input device including a touch sensitive surface and a capacitive contact-free detection system, wherein the capacitive contact-free detection system comprises a plurality of detection electrodes arranged around the touch sensitive surface:
a display device for displaying selections using the input device; and
a controller configured to determine parameters associated with a position in three-dimensional space of a user input object relative to the touch sensitive surface using said capacitive contact-free detection system and select an operational mode of the input device based on the position of the user input object.

17. An electronic device in accordance with claim 16, wherein determining parameters associated with the position in three-dimensional space of the user input object includes determining an azimuth angle of the user input object and selecting a character on the graphical user interface based on the azimuth angle.

18. An electronic device in accordance with claim 16, wherein determining parameters associated with the position in three-dimensional space of the user input object includes determining an elevation angle of the user input object and selecting a first or second character on the graphical user interface based on the elevation angle.

19. An electronic device in accordance with claim 16, wherein the controller is configured to determine parameters associated with a position in three-dimensional space of a second user input object and select an operational mode of the input device based on the position of the second user input object.

20. An electronic device in accordance with claim 16, wherein the operational mode of the input device includes displaying an options menu based on the position in three-dimensional space of the user input object.

21. An electronic device in accordance with claim 16, further comprising a dictionary accessible responsive to detection of typed text and the parameters.

22. An electronic device in accordance with claim 21, the controller further configured to provide one or more auto-completion options from the dictionary associated with the typed text based upon the parameters.

23. A method, comprising:
detecting a touch position of a user object by a touch detection unit,
detecting position-related parameters of the user input object in three-dimensional space using a capacitive three-dimensional detection system, wherein the touch detection unit shares some of its electrodes with the capacitive contact-free detection system such that the capacitive contact-free detection system is operable to select a most left and a most right column and a most upper and a most lower of the electrodes of the capacitive touch sensitive surface as receiving electrodes; and
selecting a mode of operation of an electronic device based on the touch position and the position-related parameters.

24. The method of claim 23, wherein the mode of operation includes selecting first or second characters on a graphical user interface based on the position-related parameters.

25. The method of claim 23, wherein the position-related parameters comprise an azimuth angle of the user input object.

26. The method of claim 23, wherein the position-related parameters comprise an elevation angle of the user input object.

27. The method of claim 26, further comprising detecting position-related parameters of a second user input object in three dimensional space and selecting a mode of operation of the electronic device based on the position-related parameters of the second user input object in three dimensional space.

28. The method of claim 25, further comprising detecting position-related parameters of a second user input object in three dimensional space and selecting a mode of operation of the electronic device based on the position-related parameters of the second user input object in three dimensional space.

29. The method of claim 23, wherein selecting the mode of operation includes selecting one or more controls on the graphical user interface based on the position-related parameters.

30. The method of claim 23, further comprising accessing a dictionary responsive to detection of typed text and the position-related parameters.

31. The method of claim 30, further comprising providing one or more auto-completion options from the dictionary associated with the typed text based upon the position-related parameters.

32. The method of claim 30, wherein the touch position and the position-related parameters are determined using event-driven multiplexing.

* * * * *